(12) United States Patent
Jiang et al.

(10) Patent No.: US 12,695,097 B2
(45) Date of Patent: Jul. 28, 2026

(54) ELECTRODES, ELECTROCHEMICAL CELLS, AND METHODS FOR MAKING ELECTRODES

(71) Applicant: GM GLOBAL TECHNOLOGY OPERATIONS LLC, Detroit, MI (US)

(72) Inventors: Meng Jiang, Rochester Hills, MI (US); Meinan He, Birmingham, MI (US); Louis G. Hector, Jr., Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 629 days.

(21) Appl. No.: 18/301,316

(22) Filed: Apr. 17, 2023

(65) Prior Publication Data

US 2024/0347735 A1     Oct. 17, 2024

(51) Int. Cl.
*H01M 4/62* (2006.01)
*H01M 4/02* (2006.01)
*H01M 4/04* (2006.01)

(52) U.S. Cl.
CPC ......... *H01M 4/628* (2013.01); *H01M 4/0471* (2013.01); *H01M 4/049* (2013.01); *H01M 2004/028* (2013.01)

(58) Field of Classification Search
CPC ...... H01M 4/628; H01M 4/62; H01M 4/0471; H01M 4/04; H01M 4/049; H01M 4/366; H01M 4/505; H01M 4/525; H01M 4/13; H01M 4/139; H01M 10/0525
See application file for complete search history.

(56) References Cited

U.S. PATENT DOCUMENTS

| | | | |
|---|---|---|---|
| 2002/0092984 A1* | 7/2002 | Colbert | ................. B82Y 35/00 |
| 2007/0077480 A1* | 4/2007 | Curello | ............. H01M 8/04216 |
| | | | 429/513 |
| 2011/0143204 A1* | 6/2011 | Paik | ................. H01M 10/4235 |
| | | | 429/223 |
| 2014/0120423 A1* | 5/2014 | Matsuo | ................. H01M 4/663 |
| | | | 429/231.1 |

* cited by examiner

*Primary Examiner* — Adam J Francis
(74) *Attorney, Agent, or Firm* — Quinn IP Law

(57) ABSTRACT

Electrodes, electrochemical cells and methods for making electrodes are provided. In one example, an electrode includes an electrode base material. The electrode further includes an oxygen-scavenger material that is disposed on the electrode base material.

16 Claims, 2 Drawing Sheets

ELECTRODES, ELECTROCHEMICAL CELLS, AND METHODS FOR MAKING ELECTRODES

INTRODUCTION

The present disclosure relates generally to electrochemical cells, and more particularly, relates to electrodes that include an oxygen-scavenger material, electrochemical cells including such electrodes, and methods for making such electrodes.

Advanced energy storage devices and systems are in demand to satisfy energy and/or power requirements for a variety of products, including automotive products such as start-stop systems (e.g., 12V start-stop systems), battery-assisted systems, hybrid electric vehicles ("HEVs"), and electric vehicles ("EVs"). Typical lithium-ion batteries include at least two electrodes and an electrolyte and/or separator. One of the two electrodes may serve as a positive electrode or cathode and the other electrode may serve as a negative electrode or anode. A separator and/or electrolyte is disposed between the negative and positive electrodes. The electrolyte is suitable for conducting lithium ions between the electrodes and may be in solid and/or liquid form and/or a hybrid thereof.

Many different materials may be used to create components for a lithium-ion battery. For example, the negative electrode typically includes a lithium insertion material or an alloy host material. For example, typical electroactive materials for forming an anode include lithium (e.g., lithium metal), graphite and other forms of carbon, silicon and silicon oxide, tin and tin alloys. The positive electrode materials for lithium batteries typically include an electroactive material that can be intercalated with lithium ions, such as lithium-transition metal oxides or mixed oxides, or one or more phosphate compounds, for example including lithium iron phosphate or mixed lithium manganese-iron phosphate.

Cathode materials such as lithium nickel cobalt manganese oxide (e.g., $LiNi_xCo_yMn_zO_2$ (where x+y+z=1)) with a layer structure, which are commonly referred to as NCM, and over lithiated NCM, which are high-energy Li-rich and commonly referred to as HE-NCM, are promising cathode materials due their high operating voltage and high specific capacity. However, reactive singlet oxygen may be released from the cathode when charging Li-ion batteries, for example NCM and HE-NCM Li-ion batteries, to a state of charge (SOC) of, for example, about 80% or greater during battery cycling. Additionally, the charge oxide material can also release oxygen when decomposed at relatively high temperatures. This released, reactive oxygen is in gaseous form and can accumulate and/or build up in the battery, potentially leading to battery health issues, for example thermal runaway issues, degradation, and/or the like.

SUMMARY

An electrode for an electrochemical cell is provided. The electrode includes an electrode base material. An oxygen-scavenger material is disposed on the electrode base material.

In some embodiments, the oxygen-scavenger material is an intermediate oxidation state compound.

In some embodiments, the intermediate oxidation state compound is one of an intermediate oxidation state inorganic compound and an intermediate oxidation state organic compound.

In some embodiments, the oxygen-scavenger material is chosen from $FeCO_3$, $NaSO_3$, $Na_2SO_3$, poly 3-(methylsulfinyl)prop-1-ene, poly acrylic (bis(2,2,2,-trifluoroethyl)phosphorous) anhydride, or combinations thereof.

In some embodiments, the oxygen-scavenger material is present in an amount of from about 1 wt. % to about 20 wt. %, based on a total weight of the electrode.

In some embodiments, the electrode is a cathode and the electrode base material is a positive electroactive material that comprises Mn, Ni, Co, Cr, Fe, V, Li, or a combination thereof.

In some embodiments, the electrode base material is configured as particles and the oxygen-scavenger material is coated overlying outer surfaces of the particles.

In some embodiments, the electrode further includes a binder that holds the particles coated with the oxygen-scavenger material together.

In some embodiments, the electrode further includes conductive particles that are dispersed throughout the electrode together with the particles coated with the oxygen-scavenger material.

According to an alternative embodiment, an electrochemical cell includes a positive electrode. The positive electrode includes a positive electrode base material and an oxygen-scavenger material that is disposed on the positive electrode base material. The electrochemical cell further includes a negative electrode and a separator. The separator is disposed between the positive and negative electrodes. The separator is electrically insulating and ionically conductive. An electrolyte is operatively disposed between the positive and negative electrodes and interfaces with the separator to conduct ions between the positive and negative electrodes.

In some embodiments, the oxygen-scavenger material is an intermediate oxidation state compound.

According to an alternative embodiment, a method for making an electrode is provided. The method includes coating particles of an electrode base material with an oxygen-scavenger material to form a coated electrode base powder. The method further includes binding the coated electrode base powder together with a binder.

In some embodiments, the oxygen-scavenger material is an intermediate oxidation state compound.

In some embodiments, coating the particles includes forming a slurry that comprises the particles of the electrode base material, and reacting one or more oxygen-scavenger precursor materials in the slurry at reaction conditions to form the coated electrode base powder.

In some embodiments, the oxygen-scavenger material includes $FeCO_3$. Forming the slurry includes forming the slurry that furthers includes cathode active materials, $Fe(NO_3)_3 \cdot 9H_2O$, urea, and tetraethoxysilane (TEOS). Reacting the one or more oxygen-scavenger precursor materials includes heating and pressurizing the slurry at the reaction conditions that include a temperature of from about 180° C. to about 220° C., a pressure of from about 1.5 atm to about 10 atm, and for a time of from about 1 hour to about 72 hours.

In some embodiments, the oxygen-scavenger material includes $NaSO_3$. Forming the slurry includes forming the slurry that furthers includes NaOH and/or $Na_2CO_3$, cathode active materials and water. Reacting the one or more oxygen-scavenger precursor materials includes exposing the slurry to $SO_2$ at the reaction conditions that include a temperature of from about 10° C. to about 60° C., and for a time of from about 30 minutes to about 24 hours.

In some embodiments, the method further includes removing the coated electrode base powder from the slurry, rinsing the coated electrode base powder with a solvent, and drying the coated electrode base powder.

In some embodiments, removing the coated electrode base powder includes filtering out the coated electrode base powder from the slurry. Drying the coated electrode base powder includes drying the coated electrode base powder at a temperature of from about 70° C. to about 130° C. for a time of from about 1 hours to about 24 hours.

In some embodiments, binding the coated electrode base powder includes forming a mixture comprising the coated electrode base powder, the binder, and optionally a solvent, and forming the electrode using the mixture. The electrode includes the coated electrode base powder held together by the binder.

In some embodiments, forming the mixture includes forming the mixture further including conductive particles. Forming the electrode includes forming the electrode including the conductive particles and the coated electrode base powder held together by the binder.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

Figure 1:
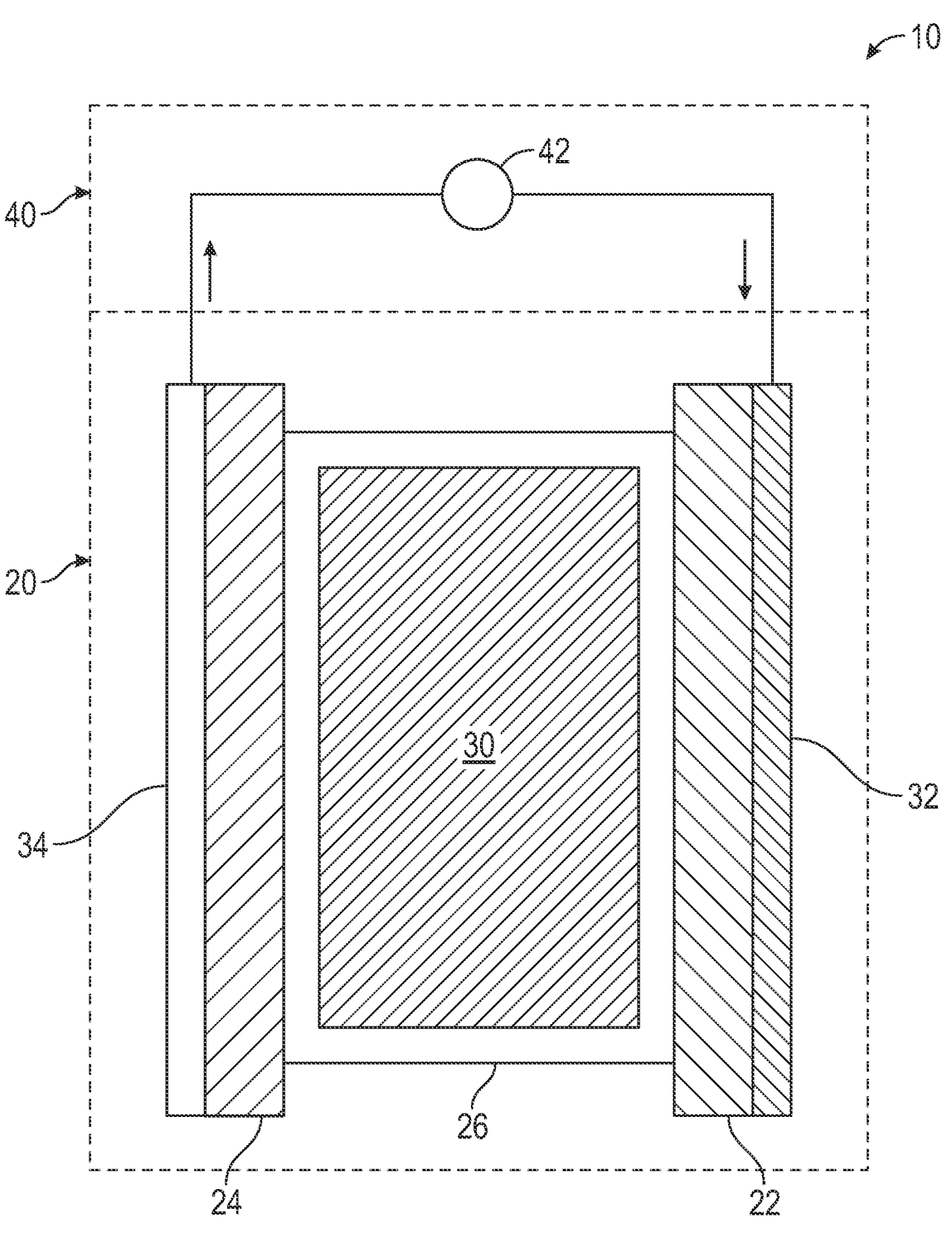
FIG. 1 is a schematic perspective view of an electrochemical cell according to an embodiment of the disclosure.

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Unless specifically stated from context, as used herein, the term "about" is understood as within a range of normal tolerance in the art, for example within 2 standard deviations of the mean. "About" can be understood as within 10%, 5%, 1%, 0.5%, 0.1%, 0.05%, or 0.01% of the stated value. "About" can alternatively be understood as implying the exact value stated. Unless otherwise clear from the context, the numerical values provided herein are modified by the term "about."

The present disclosure relates to electrodes for electrochemical cells, electrochemical cells, and methods for making electrodes. In accordance with one or more embodiments of the disclosure, an electrochemical cell includes a positive electrode, a negative electrode, and a separator that is disposed between the positive and negative electrodes. In an exemplary embodiment, the positive electrode includes a positive electrode base material. An oxygen-scavenger material is disposed on the positive electrode base material. The separator is electrically insulating and ionically conductive. An electrolyte is operatively disposed between the positive and negative electrodes (e.g., infiltrated into the porosity of the positive and negative electrodes) and interfaces with the separator (infiltrated into the porosity of the separator) to conduct ions between the positive and negative electrodes.

In an exemplary embodiment, the oxygen-scavenger material of the positive electrode is or includes an intermediate oxidation state compound. As used herein, the phrase "oxidation state" refers to the degree of oxidation of the compound. Further, the phrase "intermediate oxidation state" refers to an intermediate degree of oxidation, for example somewhere between a minimum oxidation state and a maximum oxidation state, where the compound is capable of further oxidation by reacting with oxygen to form a product compound with a higher degree of oxidation or a maximum oxidation state.

In accordance with one or more embodiments of the disclosure, during battery use, cycling and/or charging of the electrochemical cell, oxygen may be produced in a gaseous form or a singlet form from the positive electrode, for example, when the state of charge (SOC) of the electrochemical cell (battery) is at about 80% or greater. Advantageously, the oxygen-scavenger material is disposed in or otherwise forms part of the positive electrode so that the oxygen comes into contact with the oxygen-scavenger material.

In accordance with one or more embodiments of the disclosure, advantageously the oxygen-scavenger material, which is or includes an intermediate oxidation state compound, reacts with the oxygen to form a product compound that has a higher degree of oxidation or maximum oxidation state. As such, the oxygen produced from the positive electrode is converted to or otherwise chemically bound in the product compound and is no longer available, for example, within the electrochemical cell as a reactive gas that would otherwise detrimentally affect the health of the battery.

Referring now to the drawings, wherein like numerals indicate like parts in the various views, an electrochemical cell and a method(s) for making an electrode for an electrochemical cell are shown and described herein. FIG. 1 is a schematic perspective view of an electrochemical cell 10 according to an embodiment of the disclosure. As illustrated, the electrochemical cell 10 is configured as a lithium-ion battery 20. The lithium-ion battery 20 includes a negative electrode 22, a positive electrode 24, and a porous separator 26 (e.g., a microporous or nano-porous polymeric separator) disposed between the negative and positive electrodes 22 and 24. An electrolyte 30 is disposed between the negative and positive electrodes 22 and 24 and interfaces with the porous separator 26, for example, the electrolyte 30 is disposed in pores of the porous separator 26. The electrolyte 30 may also be present in the negative electrode 22 and positive electrode 24, such as in their pores. Although FIG. 1 illustrates the porous separator 26 as being disposed about (e.g., surrounding) the electrolyte 30 and directly interfacing with the negative and positive electrodes 22 and 24, it is to be understood that various other embodiments of lithium-ion batteries may be configured with the porous separator 26 being disposed in and surrounded by the electrolyte 30 (e.g., with the porous separator 26 being spaced apart from the negative and positive electrodes 22 and 24) and the electrolyte 30 directly interfacing with the negative and positive electrodes 22 and 24.

A negative electrode current collector 32 is positioned at or near the negative electrode 22. A positive electrode current collector 34 is positioned at or near the positive electrode 24. While not shown, the negative electrode current collector 32 and the positive electrode current collector 34 may be coated on one or both sides. In certain embodiments, the current collectors 32 and 34 may be coated with an electroactive material/electrode layer on both sides. The negative electrode current collector 32 and positive electrode current collector 34 respectively collect and move free electrons to and from an external circuit 40. The interruptible external circuit 40 includes a load device 42 and connects the negative electrode 22 (through the negative electrode current collector 32) and the positive electrode 24 (through the positive electrode current collector 34).

The porous separator 26 operates as both an electrical insulator and a mechanical support. More particularly, the porous separator 26 is disposed between the negative electrode 22 and the positive electrode 24 to prevent or reduce physical contact and thus, the occurrence of a short circuit. The porous separator 26, in addition to providing a physical barrier between the two electrodes 22, 24, can provide a minimal resistance path for internal passage of lithium ions (and related anions) during cycling of the lithium ions to facilitate functioning of the lithium-ion battery 20.

The lithium-ion battery 20 can generate an electric current during discharge by way of reversible electrochemical reactions that occur when the external circuit 40 is closed (to electrically connect the negative electrode 22 and the positive electrode 24) when the negative electrode 22 contains a relatively greater quantity of cyclable lithium. The chemical potential difference between the positive electrode 24 and the negative electrode 22 drives electrons produced by the oxidation of lithium (e.g., intercalated/alloyed/plated lithium) at the negative electrode 22 through the external circuit 40 toward the positive electrode 24. Lithium ions, which are also produced at the negative electrode 22, are concurrently transferred through the electrolyte 30 and porous separator 26 towards the positive electrode 24. The electrons flow through the external circuit 40 and the lithium ions migrate across the porous separator 26 in the electrolyte 30 to intercalate/alloy/plate into a positive electroactive material of the positive electrode 24. The electric current passing through the external circuit 40 can be harnessed and directed through the load device 42 until the lithium in the negative electrode 22 is depleted and the capacity of the lithium-ion battery 20 is diminished.

The lithium-ion battery 20 can be charged or re-energized at any time by connecting an external power source (e.g., charging device) to the lithium-ion battery 20 to reverse the electrochemical reactions that occur during battery discharge. The connection of an external power source to the lithium-ion battery 20 compels the lithium ions at the positive electrode 24 to move back toward the negative electrode 22. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with lithium for consumption during the next battery discharge cycle. As such, each discharge and charge event is considered to be a cycle, where lithium ions are cycled between the positive electrode 24 and negative electrode 22. As will be discussed in further detail below, in some non-limiting embodiments, during cycling or charging of the lithium-ion battery 20, oxygen (e.g., singlet oxygen) may be released from the positive electrode 24, for example, when the SOC of the lithium-ion battery 20 is at about 80% or greater.

The external power source that may be used to charge the lithium-ion battery 20 may vary depending on the size, construction, and particular end-use of the lithium-ion battery 20. Some notable and exemplary external power sources include, but are not limited to, AC power sources, such as an AC wall outlet or a motor vehicle alternator. A converter may be used to change from AC to DC for charging the battery 20.

In many lithium-ion battery configurations, each of the negative electrode current collector 32, negative electrode 22, the separator 26, positive electrode 24, and positive electrode current collector 34 are prepared as relatively thin layers (for example, from several microns to a millimeter or less in thickness) and assembled in layers connected in an electrical series and/or parallel arrangement to provide a suitable electrical energy and power package. Furthermore, the lithium-ion battery 20 can include a variety of other components that, while not depicted here, are nonetheless recognized to those of skill in the art. For instance, the lithium-ion battery 20 may include a casing, gaskets, terminal caps, tabs, battery terminals, and other battery-type components or materials that may be situated within the battery 20, including between or around the negative electrode 22, the positive electrode 24, and/or the separator 26, by way of example. As noted above, the size and shape of the lithium-ion battery 20 may vary depending on the particular application for which it is designed. Battery-powered vehicles and handheld consumer electronic devices are two examples where the lithium-ion battery 20 would most likely be designed to different size, capacity, and power-output specifications. The lithium-ion battery 20 may also be connected in series or parallel with other similar lithium-ion cells or batteries to produce a greater voltage output, energy, and/or power as required by the load device 42.

Accordingly, the lithium-ion battery 20 can generate electric current to a load device 42 that can be operatively connected to the external circuit 40. While the load device 42 may be any number of known electrically powered devices, a few specific examples of power-consuming load devices include an electric motor for a hybrid vehicle or an all-electric vehicle, a laptop computer, a tablet computer, a cellular phone, and cordless power tools or appliances, by way of example. The load device 42 may also be a power-generating apparatus that charges the lithium-ion battery 20 for the purpose of storing energy. In certain other variations, the electrochemical cell may be a supercapacitor, such as a lithium-ion based supercapacitor.

Electrolyte

In general, the electrolyte 30 may be a polymer electrolyte and/or in liquid or gel form and is capable of conducting lithium ions between the negative electrode 22 and the positive electrode 24 for use in the lithium-ion battery 20. In certain embodiments, the electrolyte 30 is a non-aqueous liquid electrolyte solution that includes one or more lithium salts dissolved in an organic solvent or a mixture of organic solvents/co-solvents. Appropriate lithium salts generally have inert anions. More specifically, the one or more lithium salts may include one or more cations coupled with one or more anions. Non-limiting examples of cations may be chosen from $Li^+$, $Na^+$, $K^+$, $Al^{3+}$, $Mg^{2+}$, and the like. Non-limiting examples of anions may be chosen from $PF_6^-$, $BF_4^-$, $TFSI^-$, $FSI^-$, $CF_3SO_3^-$, $(C_2F_5S_2O_2)N^-$, and the like.

Porous Separator

The porous separator 26 may include, in certain variations, a microporous polymeric separator including a polyolefin, including those made from a homopolymer (derived from a single monomer constituent) or a heteropolymer (derived from more than one monomer constituent), which may be either linear or branched. In certain embodiments, the polyolefin may be polyethylene (PE), polypropylene (PP), or a blend of PE and PP, or multi-layered structured porous films of PE and/or PP. Commercially available polyolefin porous separator membranes include CEL-GARD® 2500 (a monolayer polypropylene separator) and CELGARD® 2340 (a trilayer polypropylene/polyethylene/polypropylene separator) available from Celgard LLC. In other embodiments, the porous separator 26 may be a porous polyaramid separator.

When the porous separator 26 is a microporous polymeric separator, it may be a single layer or a multi-layer laminate. For example, in one embodiment, a single layer of the polyolefin may form the entire microporous polymer separator 26. In other aspects, the separator 26 may be a fibrous membrane having an abundance of pores extending between the opposing surfaces and may have a thickness of less than 50 microns, for example. As another example, however, multiple discrete layers of similar or dissimilar polyolefins may be assembled to form the microporous polymer separator 26. The microporous polymer separator 26 may also include other polymers alternatively or in addition to the polyolefin such as, but not limited to, polyethylene terephthalate (PET), polyvinylidene fluoride (PVDF), polyamide (nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polymethylpentene, poly-olefin copolymers, acrylonitrile-butadiene styrene copolymers (ABS), polystyrene copolymers, polymethylmethacrylate (PMMA), polysiloxane polymers (e.g., polydimethylsiloxane (PDMS)), polybenzimidazole (PBI), polybenzoxazole (PBO), polyphenylenes, polyarylene ether ketones, polyperfluorocyclobutanes, polyvinylidene fluoride copolymers (e.g., PVDF-hexafluoropropylene or (PVDF-HFP)), and polyvinylidene fluoride terpolymers, polyvinylfluoride, liquid crystalline polymers (e.g., VECTRAN® (Hoechst AG, Germany) and ZENITE® (DuPont, Wilmington, Del.)), polyaramides, polyphenylene oxide, cellulosic materials, meso-porous silica, or a combination thereof. Various commercially available polymers and products for forming the separator 26 are contemplated, as well as the many manufacturing methods that may be employed to produce such a microporous polymer separator 26.

Positive Electrode

Figure 2:
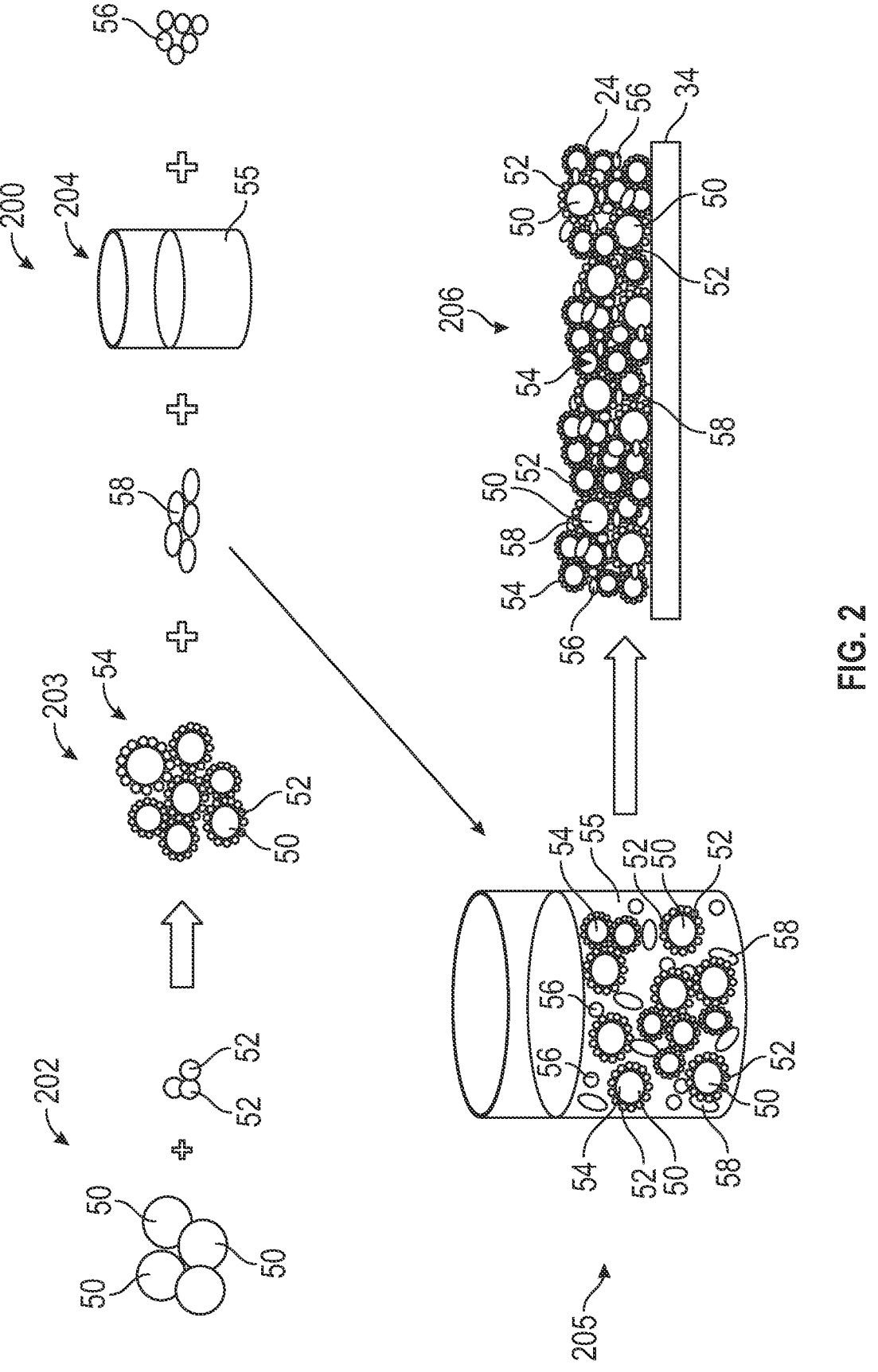
FIG. 2 is a flowchart of a method for making an electrode for an electrochemical cell according to an embodiment of the disclosure.

Referring also to FIG. 2 at STEP 206, in an exemplary embodiment, the positive electrode 24 (e.g., cathode) includes an electrode base material 50 and an oxygen-scavenger material 52 that coats or otherwise is disposed on the electrode base material 50. The electrode base material 50 may be formed from, include, or consist of a lithium-based active material that can undergo lithium intercalation and deintercalation, alloying and dealloying, while functioning as the positive terminal material of the lithium-ion battery 20. The electrode base material 50 may be or include a positive electroactive material. Positive electroactive materials may include one or more transition metal cations, such as manganese (Mn), nickel (Ni), cobalt (Co), chromium (Cr), iron (Fe), vanadium (V), and combinations thereof. In accordance with one or more embodiments of the disclosure, the electrode base material 50 includes or consists of NCM cathode materials such as lithium (Li) nickel cobalt manganese oxide (e.g., $LiNi_xCo_yMn_zO_2$ (where x+y+z=1)) with a layer structure, or includes or consists of HE-NCM cathode materials of lithiated NCM, which are high-energy Li-rich.

In one or more embodiments of the disclosure, the electrode base material 50 is configured as particles (e.g., powder) and the oxygen-scavenger material 52 is coated overlying outer surfaces of the particles, thereby forming a coated electrode base powder 54. In an exemplary embodiment, the oxygen-scavenger material 52 is an intermediate oxidation state compound. In particular, the oxygen-scavenger material 52 may be an intermediate oxidation state inorganic compound or an intermediate oxidation state organic compound. In an exemplary embodiment, the oxygen-scavenger material 52 is chosen from $FeCO_3$, $NaSO_3$, $Na_2SO_3$, poly 3-(methylsulfinyl)prop-1-ene, poly acrylic (bis(2,2,2,-trifluoroethyl)phosphorous) anhydride, or combinations thereof. In an exemplary embodiment, the oxygen-scavenger material 52 is present in an amount of from about 1 wt. % to about 20 wt. %, based on a total weight of the positive electrode 24.

As illustrated, the coated electrode base powder 54 may be intermingled with an optional electrically conductive particles 56 (conductive additive(s) formed of electrically-conductive material) and a polymeric binder 58. The binder 58 may both hold together the positive electroactive material and provide ionic conductivity to the positive electrode 24. The polymeric binder 58 may include polyvinylidene fluoride (PVDF), poly(vinylidene chloride) (PVC), poly((dichloro-1,4-phenylene)ethylene), carboxymethoxyl cellulose (CMC), nitrile butadiene rubber (NBR), fluorinated urethanes, fluorinated epoxides, fluorinated acrylics, copolymers of halogenated hydrocarbon polymers, epoxides, ethylene propylene diamine termonomer rubber (EPDM), hexafluoropropylene (HFP), ethylene acrylic acid copolymer (EAA), ethylene vinyl acetate copolymer (EVA), EAA/EVA copolymers, PVDF/HFP copolymers, polyvinylidene difluoride (PVdF), lithium polyacrylate (LiPAA), sodium polyacrylate (NaPAA), sodium alginate, lithium alginate, or combinations thereof.

The coated electrode base powder 54 loading in the binder 58 can be large, such as greater than about 80% by weight, based on a total weight of the positive electrode 24. For example, the binder 58 can be present at a level of greater than or equal to about 1% by weight to less than or equal to about 20% by weight, based on a total weight of the positive electrode 24.

Electrically conductive particles 56 may include graphite, other carbon-based materials, conductive metals, or conductive polymer particles. Carbon-based materials may include, by way of example, particles of KETJEN® black, DENKA® black, acetylene black, carbon black, and the like. Conductive metal particles may include nickel, gold, silver, copper, aluminum, and the like. Examples of a conductive polymer include polyaniline, polythiophene, polyacetylene, polypyrrole, and the like. In certain embodiments, mixtures of electrically conductive materials may be used.

Negative Electrode

Referring to FIG. 1, the negative electrode 22 may include a negative electroactive material as a lithium host material capable of functioning as a negative terminal of the lithium-ion battery 20. Common negative electroactive materials include lithium insertion materials or alloy host materials or plating and stripping materials. Such materials can include carbon-based materials, such as lithium-graphite intercalation compounds, lithium-silicon compounds, lithium-tin alloys, or lithium titanate.

In certain embodiments, the negative electrode 22 may include lithium, and in certain variations metallic lithium and the lithium-ion battery 20. The negative electrode 22 may be a lithium metal electrode (LME). The lithium-ion battery 20 may be a lithium-metal battery or cell. Metallic lithium for use in the negative electrode of a rechargeable battery has various potential advantages, including having the highest theoretical capacity and lowest electrochemical potential. Thus, batteries incorporating lithium-metal anodes can have a higher energy density that can potentially double storage capacity, so that the battery may be half the size, but still last the same amount of time as other lithium-ion batteries.

In certain variations, the negative electrode 22 may optionally include an electrically conductive material, as well as one or more polymeric binder materials to structurally hold the lithium material together. For example, in one embodiment, the negative electrode 22 may include an active material including lithium-metal particles intermingled with a binder material chosen from polyvinylidene difluoride (PVDF), ethylene propylene diene monomer (EPDM) rubber, carboxymethoxyl cellulose (CMC), a nitrile butadiene rubber (NBR), lithium polyacrylate (LiPAA), sodium polyacrylate (NaPAA), sodium alginate, lithium alginate, or a combination thereof. Suitable additional electrically conductive materials may include carbon-based material or a conductive polymer. Carbon-based materials may include by way of example, particles of KETJEN® black, DENKA® black, acetylene black, carbon black, and the like. Examples of a conductive polymer include polyaniline, polythiophene, polyacetylene, polypyrrole, and the like. In certain embodiments, mixtures of conductive materials may be used. The negative electrode 22 may include from about 50 to about 100% by weight of an electroactive material (e.g., lithium particles or a lithium foil), optionally greater than or equal to about 30% by weight of an electrically conductive material, and a balance binder.

In some embodiments, a solid electrolyte interface (SEI) layer is disposed on the active material particles in the negative electrode 22. In particular, the SEI layer is a product of electrolyte decomposition at the initial cycles and will passivate the negative electrode 22 surface to mitigate the further decomposition of liquid electrolyte 30 which would irreversibly consume Li and lead to short battery life. The ionic conductivity of the SEI layer is important for low cell internal resistance.

Current Collectors

The negative and positive electrodes 22 and 24 are generally associated with the respective negative and positive electrode current collectors 32 and 34 to facilitate the flow of electrons between the electrode and the external circuit 40. The current collectors 32 and 34 are electrically conductive and can include metal, such as a metal foil, a metal grid or screen, or expanded metal. Expanded metal current collectors refer to metal grids with a greater thickness such that a greater amount of electrode material is placed within the metal grid. By way of example, electrically-conductive materials include copper, nickel, aluminum, stainless steel, titanium, alloys thereof, or combinations thereof.

The positive electrode current collector 34 may be formed from aluminum or any other appropriate electrically conductive material used by those of skill in the art. The negative electrode current collector 32 may be formed from copper or any other appropriate electrically conductive used by those of skill in the art. Negative electrode current collectors do not typically include aluminum. In particular, aluminum will ultimately dissolve in the operating range of anodes since its standard redox potential is 1.37V vs. Li/Li$^+$. At even lower operating potentials, e.g. 0V-0.2 V vs. Li/Li$^+$, aluminum can alloy with lithium. Interstitial compound formation is facilitated by the similarity between octahedral void size in aluminum and lithium.

Referring also to FIG. 2 at STEP 206, as discussed above, depending upon the composition of the positive electrode 24 and/or the state of charge, during battery operation, cycling and/or charging of the lithium-ion battery 20, oxygen may be released from the positive electrode 24. In accordance with one or more embodiments of the disclosure, the released oxygen readily contacts the oxygen-scavenger material 52 that includes an intermediate oxidation state compound. The intermediate oxidation state compound reacts to form a product compound (e.g., liquid or solid product) that has a higher degree of oxidation or maximum oxidation state with the released oxygen chemically bound as part of the product compound. In some embodiments, advantageously the product compound provides enhanced cycling stability of the lithium-ion battery 20.

The following examples are provided for illustration purposes only and are not meant to limit the various embodiments of the oxygen-scavenger material 52 in any way.

EXAMPLES—Intermediate oxidation state compounds reacting with released gaseous oxygen to form product compounds that have a higher degree of oxidation or maximum oxidation state.

Example 1—chemical equation 1 provided below illustrates $FeCO_3$ (intermediate oxidation state compound) reacting with oxygen to form $Fe_2(CO_3)_3$ (product compound with a higher degree of oxidation or maximum oxidation state compared to $FeCO_3$):

$$FeCO_3 + O_2 + 2CO_2 \rightarrow Fe_2(CO_3)_3 \qquad \text{Eq. 1}$$

Example 2—chemical equation 2 provided below illustrates $NaSO_3$ (intermediate oxidation state compound) reacting with oxygen to form $NaSO_4$ (product compound with a higher degree of oxidation or maximum oxidation state compared to $NaSO_3$):

$$NaSO_3 + 1/2O_2 \rightarrow NaSO_4 \qquad \text{Eq. 2}$$

Referring to FIG. 2, a flowchart of a method 200 for making an electrode for a lithium-ion battery according to an embodiment of the disclosure is provided. In an exemplary embodiment, the electrode is the positive electrode 24 as discussed above. The method 200 includes providing (STEP 202) the electrode base material 50 and the oxygen-scavenger material 52 as described in the foregoing disclosure. The electrode base material 50 is coated (STEP 203) with the oxygen-scavenger material 52 to form a coated electrode base powder 54.

In one embodiment, coating the electrode base material 50 with the oxygen-scavenger material 52 includes forming a slurry that includes particles of the electrode base material 50 and reacting one or more oxygen-scavenger precursor materials in the slurry at reaction conditions to form the coated electrode base powder 54. In one example, the oxygen-scavenger material includes FeCO$_3$ and forming the slurry includes forming the slurry that includes cathode active material, Fe(NO$_3$)$_3$·9H$_2$O, urea, and tetraethoxysilane (TEOS). The slurry is heated and pressurized, for example in an autoclave, at the reaction conditions to react the Fe(NO$_3$)$_3$·9H$_2$O, urea, and TEOS (oxygen-scavenger precursor materials) and coat the electrode base material 50 to form the coated electrode base powder 54. In an exemplary embodiment, the reaction conditions include a temperature of from about 180° C. to about 220° C., a pressure of from about 1.5 atm to about 10 atm, and for a time of from about 1 hour to about 72 hours.

In another example, the oxygen-scavenger material includes NaSO$_3$ and forming the slurry includes combining NaOH and/or Na$_2$CO$_3$ (oxygen-scavenger precursor materials) with cathode active material in water. The NaOH and/or Na$_2$CO$_3$ combined with the cathode active material are exposed to SO$_2$ gas (another oxygen-scavenger precursor materials) at the reaction conditions to form the oxygen-scavenger materials and coat the electrode base material 50 to form the coated electrode base powder 54. In an exemplary embodiment, the reaction conditions include a temperature of from about 10° C. to about 60° C., and for a time of from about 30 minutes to about 24 hours.

In one or more embodiments of the disclosure, the coated electrode base powder 54 is removed from the slurry, and rinsed with a solvent, followed by drying. Non-limiting examples of a solvent include water, ethanol, or the like, or combinations thereof. In an exemplary embodiment, the coated electrode base powder 54 is removed by filtering out the coated electrode base powder 54 from the slurry and is dried at a temperature of from about 70° C. to about 130° C. for a time of from about 1 hours to about 24 hours.

In one or more embodiments, the coated electrode base powder 54 is held or otherwise bound together with the binder 58 as described in the foregoing disclosure. In particular and as illustrated, the coated electrode base powder 54 may be combined with the binder 58, the conductive particles 56, and optionally a solvent 55 (STEP 204) to form a mixture (STEP 205). Non-limiting examples of the solvent 55 include n-methyl-2-pyrrolidone, water, ethanol, acetone, acetonitrile, or the like, or combinations thereof. The process continues by forming (STEP 206) the positive electrode 24 using the mixture. In one example, the mixture includes the solvent 55 and is applied to the positive current collector 34 using a spray process. The mixture is then allowed to dry at room temperature or via heating to drive the solvent 55 off leaving the remaining solids, i.e., the coated electrode base powder 54, the binder 58, and the conductive particles 56. Optionally, the remaining solids may be subsequently calendared. In another example, the mixture is a dry mixture, e.g., free of any solvent 55, and is sprayed directly on to the positive current collector 34 or calendared into a freestanding film that is subsequently applied to the positive current collector 34. In an exemplary embodiment, the binder 58 is present in the dry mixture in an amount of 0.5 wt. % to about 20 wt. %, the conductive particles 56 are present in the dry mixture in an amount of 0.5 wt. % to about 20 wt. %, and the coated electrode base powder 54 is present in the dry mixture in an amount of 60 wt. % to about 99 wt. %. If the solvent 55 is used, the solvent ratio can be from about 10 wt. % to about 60 wt. % of the wet mixture, e.g., the weight of the dry ingredients (dry mixture) plus the weight of the solvent 55.

While the best modes for carrying out the disclosure have been described in detail, those familiar with the art to which this disclosure relates will recognize various alternative designs and embodiments for practicing the disclosure within the scope of the appended claims.

What is claimed is:

1. An electrode for an electrochemical cell, the electrode comprising:
  an electrode base material that is a positive electroactive material configured as particles having respective outer surfaces; and
  an oxygen-scavenger material that is an intermediate oxidation state compound coated overlying the respective outer surfaces of the particles;
  wherein the intermediate oxidation state compound is capable of chemically reacting with oxygen released from the electrode base material during at least one of use, cycling, and charging of the electrochemical cell at a state of charge of about 80% or greater to be consumed and form a product compound having a higher degree of oxidation than the intermediate oxidation state compound, such that the oxygen is chemically bound in the product compound and is no longer available as a reactive gas within the electrochemical cell.

2. The electrode of claim 1, wherein the intermediate oxidation state compound is one of an intermediate oxidation state inorganic compound and an intermediate oxidation state organic compound.

3. The electrode of claim 1, wherein the oxygen-scavenger material is chosen from FeCO$_3$, NaSO$_3$, Na$_2$SO$_3$, poly 3-(methylsulfinyl)prop-1-ene, poly acrylic (bis(2,2,2,-trifluoroethyl)phosphorous) anhydride, or combinations thereof.

4. The electrode of claim 1, wherein the oxygen-scavenger material is present in an amount of from about 1 wt. % to about 20 wt. %, based on a total weight of the electrode.

5. The electrode of claim 1, wherein the electrode is a cathode and the positive electroactive material comprises Mn, Ni, Co, Cr, Fe, V, Li, or a combination thereof.

6. The electrode of claim 1, further comprising a binder that holds the particles coated with the oxygen-scavenger material together.

7. The electrode of claim 6, further comprising conductive particles that are dispersed throughout the electrode together with the particles coated with the oxygen-scavenger material.

8. An electrochemical cell comprising:
  a positive electrode comprising:
    a positive electrode base material configured as particles having respective outer surfaces; and
    an oxygen-scavenger material that is an intermediate oxidation state compound coated overlying the respective outer surfaces of the particles;
    wherein the intermediate oxidation state compound is capable of chemically reacting with oxygen released from the positive electrode base material during at least one of use, cycling, and charging of the electrochemical cell at a state of charge of about 80% or greater to be consumed and form a product compound having a higher degree of oxidation than the intermediate oxidation state compound, such that the oxygen is chemically bound in the product compound and is no longer available as a reactive gas within the electrochemical cell;
  a negative electrode;
  a separator disposed between the positive and negative electrodes, wherein the separator is electrically insulating and ionically conductive; and an electrolyte operatively disposed between the positive and negative electrodes and interfacing with the separator to conduct ions between the positive and negative electrodes.

9. D) A method for making an electrode of an electrochemical cell, the method comprising:

coating respective outer surfaces of particles of a positive electrode base material with an oxygen-scavenger material that is an intermediate oxidation state compound such that the intermediate oxidation state overlies the respective outer surfaces of the particles to form a coated electrode base powder;

wherein the intermediate oxidation state compound is capable of chemically reacting with oxygen released from the positive electrode base material during at least one of use, cycling, and charging of the electrochemical cell at a state of charge of about 80% or greater to be consumed and form a product compound having a higher degree of oxidation than the intermediate oxidation state compound, such that the oxygen is chemically bound in the product compound and is no longer available as a reactive gas within the electrochemical cell; and binding the coated electrode base powder together with a binder.

10. The method of claim 9, wherein coating the particles comprises:

forming a slurry that comprises the particles of the positive electrode base material; and reacting one or more oxygen-scavenger precursor materials in the slurry at reaction conditions to form the coated electrode base powder.

11. The method of claim 10, wherein the oxygen-scavenger material comprises $FeCO_3$, wherein forming the slurry comprises forming the slurry that furthers comprises cathode active materials, $Fe(NO_3)_3 \cdot 9H_2O$, urea, and tetraethoxysilane (TEOS), and wherein reacting the one or more oxygen-scavenger precursor materials comprises heating and pressurizing the slurry at the reaction conditions that include a temperature of from about 180° C. to about 220° C., a pressure of from about 1.5 atm to about 10 atm, and for a time of from about 1 hour to about 72 hours.

12. The method of claim 10, wherein the oxygen-scavenger material comprises $NaSO_3$, wherein forming the slurry comprises forming the slurry that furthers comprises NaOH and/or $Na_2CO_3$, cathode active materials and water, and wherein reacting the one or more oxygen-scavenger precursor materials comprises exposing the slurry to $SO_2$ at the reaction conditions that include a temperature of from about 10° C. to about 60° C., and for a time of from about 30 minutes to about 24 hours.

13. The method of claim 10, further comprising:

removing the coated electrode base powder from the slurry;

rinsing the coated electrode base powder with a solvent; and drying the coated electrode base powder.

14. The method of claim 13, wherein removing the coated electrode base powder comprises filtering out the coated electrode base powder from the slurry, and wherein drying the coated electrode base powder comprises drying the coated electrode base powder at a temperature of from about 70° C. to about 130° C. for a time of from about 1 hours to about 24 hours.

15. The method of claim 9, wherein binding the coated electrode base powder comprises:

forming a mixture comprising the coated electrode base powder, the binder, and optionally a solvent; and forming the electrode using the mixture, wherein the electrode comprises the coated electrode base powder held together by the binder.

16. The method of claim 15, wherein forming the mixture comprises forming the mixture further comprising conductive particles, and wherein forming the electrode comprises forming the electrode comprising the conductive particles and the coated electrode base powder held together by the binder.

* * * * *